United States Patent
Andres et al.

(10) Patent No.: US 9,454,303 B2
(45) Date of Patent: Sep. 27, 2016

(54) GESTURE TOUCH INPUTS FOR CONTROLLING VIDEO ON A TOUCHSCREEN

(75) Inventors: Isaac Andres, Sunnyvale, CA (US); Jeremy Walker, San Jose, CA (US)

(73) Assignee: Google Inc., Mountain View, CA (US)

( * ) Notice: Subject to any disclaimer, the term of this patent is extended or adjusted under 35 U.S.C. 154(b) by 672 days.

(21) Appl. No.: 13/603,178

(22) Filed: Sep. 4, 2012

(65) Prior Publication Data
US 2013/0307792 A1 Nov. 21, 2013

Related U.S. Application Data

(60) Provisional application No. 61/647,942, filed on May 16, 2012.

(51) Int. Cl.
*G06F 3/0488* (2013.01)
*G11B 27/00* (2006.01)
*G11B 27/34* (2006.01)

(52) U.S. Cl.
CPC ......... *G06F 3/04883* (2013.01); *G11B 27/005* (2013.01); *G11B 27/34* (2013.01)

(58) Field of Classification Search
USPC ......... 345/173, 156–157; 715/702, 704, 716, 715/719–726
See application file for complete search history.

(56) References Cited

U.S. PATENT DOCUMENTS

| | | | |
|---|---|---|---|
| 6,342,902 B1 * | 1/2002 | Harradine et al. | 715/716 |
| 6,760,536 B1 * | 7/2004 | Amir et al. | 386/344 |
| 2001/0043794 A1 | 11/2001 | Akiba et al. | |
| 2007/0150830 A1 | 6/2007 | Ording et al. | |
| 2009/0002335 A1 | 1/2009 | Chaudhri | |
| 2009/0174677 A1 | 7/2009 | Gehani et al. | |
| 2011/0149138 A1 | 6/2011 | Watkins et al. | |
| 2011/0161818 A1 * | 6/2011 | Viljamaa | 715/720 |
| 2012/0054670 A1 * | 3/2012 | Rainisto | 715/784 |

FOREIGN PATENT DOCUMENTS

AU 2011101439 A4 12/2010

OTHER PUBLICATIONS

Moynihan, "Review: Canon PowerShot Elph 500 HS camera", Jul. 14, 2011, Macworld [online]. Retrieved from the Internet: <http://www.macworld.com/article/1161046/canon_elph_500.html> 6 pgs.

(Continued)

*Primary Examiner* — Jonathan Horner
(74) *Attorney, Agent, or Firm* — Shumaker & Sieffert, P.A.

(57) ABSTRACT

In general, this disclosure describes novel techniques for controlling video content on a computing device, such as a mobile computing device. For example, a computing device may execute a media application that provides a video output to a presence-sensitive screen of the computing device. During execution of the media application, the presence-sensitive screen may receive a gesture touch input that has motion with respect to the presence-sensitive screen. The computing device may then rewind or fast forward the video output based at least in part on the gesture touch input. The computing device may display, during the rewinding or fast forwarding of the video output, a plurality of frames of the video output concurrently on the presence-sensitive screen in lateral motion corresponding to the rewinding or fast forwarding.

29 Claims, 7 Drawing Sheets

(56) References Cited

OTHER PUBLICATIONS

"Jensen VM9312 Touchscreen 7 inch head unit", Ebay Guides [online]. First Access on Nov. 11, 2011. Retrieved from the Internet: <http://reviews.ebay.com/Jensen-VM9312-Touchscreen-7-inch-head-unit?ugid=10000000004035402> 4 pgs.

"Tap, Circle, and Swipe the new BenQ E1050t digital camera", Oct. 18, 2008, BenQ Press Summary [online]. Retrieved from the Internet: <http://www.image-acquire.com/beng-announces-e1050t-10mp-toushscreen-camera/> 2 pgs.

Invitation to Pay Additional Fees from PCT Application No. PCT/US2013/040987, 9 pages, mailed Aug. 7, 2013.

International Search Report and Written Opinion of International Application No. PCT/US2013/040987, dated Dec. 17, 2013, 15 pp.

International Preliminary Report on Patentability from International Application No. PCT/US2013/040987, mailed Nov. 27, 2014, 10 pp.

\* cited by examiner

US 9,454,303 B2

GESTURE TOUCH INPUTS FOR CONTROLLING VIDEO ON A TOUCHSCREEN

RELATED APPLICATION

This application claims the benefit of priority to U.S. Provisional Application No. 61/647,942, filed May 16, 2012, the entire content of which is hereby incorporated by reference.

BACKGROUND

Mobile computing devices with touchscreens, such as smartphones, tablet computers, and portable media players, have grown in popularity as platforms on which to watch video. A mobile computing device may have a media applications or a video application loaded on it that plays videos. The mobile computing device may be used to download videos.

SUMMARY

In general, this disclosure includes potentially more easy and intuitive new user interface features for video on a mobile computing device, or any device with a touch-sensitive screen or interface (e.g., a touchscreen). For example, through implementation of one or more techniques of the present disclosure, a user can rewind or fast forward a video simply by making a rightward or leftward swiping gesture across the touchscreen of a mobile computing device.

In one example, a method includes executing, by a computing device, a media application that provides a video output to a presence-sensitive screen of the computing device. The method further includes receiving, by the presence-sensitive screen during execution of the media application, a gesture touch input that has motion with respect to the presence-sensitive screen. The method further includes rewinding or fast forwarding the video output based at least in part on the gesture touch input. The method further includes displaying, during the rewinding or fast forwarding of the video output, a plurality of frames of the video output concurrently on the presence-sensitive screen in lateral motion corresponding to the rewinding or fast forwarding.

In another example, a method includes detecting, by a presence-sensitive screen during execution of a media application, a gesture touch input that has motion with respect to the presence-sensitive screen, on which a video output is being displayed. The method further includes displaying, on the presence-sensitive screen, a plurality of frames from the video output, the frames being located in advance of a current frame of the video output at the time the gesture touch input is detected, each of the frames being separated by a frame interval, and the interval being a function of a speed of motion of the gesture touch input, wherein the presence-sensitive screen depicts at least two of the frames concurrently, and depicts the frames moving across the presence-sensitive screen in lateral motion to provide the user with a perception of advancing video footage. The method further includes advancing a counter position indicating a currently depicted frame of the video output based on the gesture touch input and in coordination with the displaying of the plurality of frames from the video output. The method further includes resuming the video output based on the advanced counter position.

In another example, a computing device includes at least one processor, at least one data storage device, a presence-sensitive screen configured for detecting touch inputs, and machine-readable code stored on the at least one data storage device comprising executable instructions that are executable by the at least one processor. The executable instructions include executable instructions for providing a video output to the presence-sensitive screen, executable instructions for receiving a gesture touch input on the presence-sensitive screen, and executable instructions for determining a speed of the motion of the gesture touch input across the presence-sensitive screen. The executable instructions also include executable instructions to rewind or fast forward the video output if the gesture input has either a rightward motion or a leftward motion with respect to the presence-sensitive screen, wherein the rewinding or fast forwarding of the video output is performed at a speed based at least in part on the speed of the motion of the gesture input. The executable instructions also include executable instructions to display, during rewinding or fast forwarding the video output, a frame carousel comprising a plurality of frames of the video output on the presence-sensitive screen, with two or more of the frames displayed concurrently in different portions of the presence-sensitive screen and in lateral motion across the presence-sensitive screen corresponding to the rewinding or fast forwarding of the video output.

In another example, a computer-readable storage medium includes executable instructions for causing at least one processor of a computing device to perform operations. These include providing a video output to the presence-sensitive screen, receiving a gesture touch input on the presence-sensitive screen, and determining a speed of the motion of the gesture touch input across the presence-sensitive screen. These also include rewinding or fast forwarding the video output if the gesture touch input has either a rightward motion or a leftward motion with respect to the presence-sensitive screen. These also include displaying, during rewinding or fast forwarding the video output, a frame carousel comprising a plurality of frames of the video output displayed concurrently on the presence-sensitive screen in lateral motion across the presence-sensitive screen corresponding to the rewinding or fast forwarding of the video output, wherein a speed of the frame carousel is based at least in part on the speed of the motion of the gesture touch input.

The details of one or more embodiments are set forth in the accompanying drawings and the description below. Other features, objects, and advantages will be apparent from the description and drawings, and from the claims.

BRIEF DESCRIPTION OF DRAWINGS

In accordance with common practice, the various described features are not drawn to scale and are drawn to emphasize one or more features relevant to the present application. Like reference characters denote like elements throughout the figures and text.

DETAILED DESCRIPTION

Figure 1:
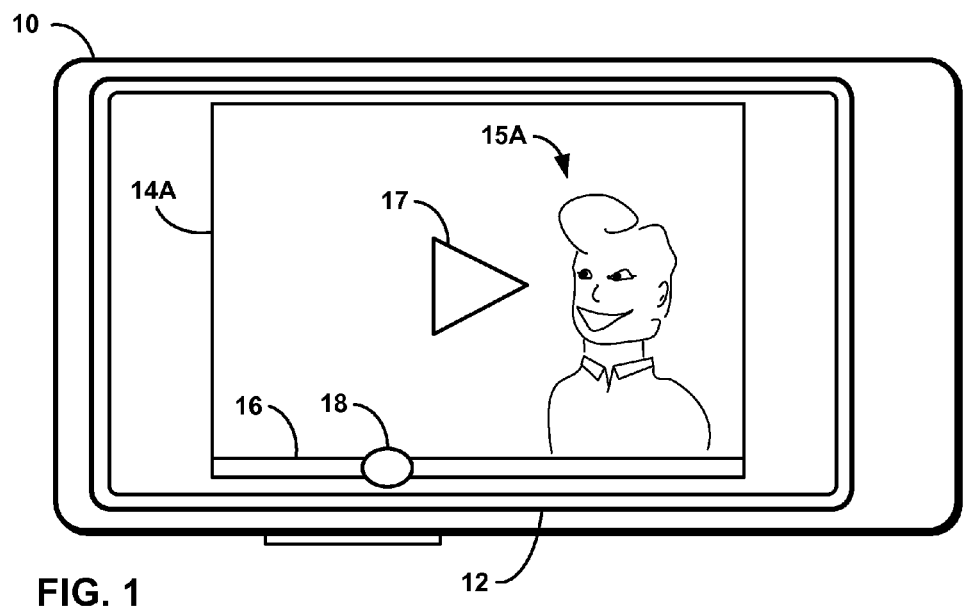
FIG. 1 is a conceptual diagram depicting an example computing device displaying video content on a touchscreen, in accordance with an illustrative example.

FIG. 1 depicts an example computing device 10, illustratively depicted as a smartphone in this example, displaying a video output or video content in a display window 14A on a touchscreen 12, in accordance with an illustrative example. Computing device 10 is configured to enable novel forms of user controls for the video content, including enabling gesture touch inputs to control rewinding and fast forwarding of the video content. A gesture touch input may be entered as a rightward or leftward swiping gesture across the surface of touchscreen 12 where the video is being displayed, and computing device 10 rewinds or fast forwards the video in response to this swiping gesture touch input.

While FIG. 1 depicts example computing device 10 in the form of a smartphone, other touchscreen-enabled computing devices may be used equivalently, such as tablet computers, netbook computers, laptop computers, desktop computers, processor-enabled televisions, personal digital assistants (PDAs), touchscreen devices connected to a video game console or set-top box, or any other computing device that has a touchscreen and is enabled to play or execute a media application or other video application or to display a video output or video content. The terms "video content" and "a video output" may be used interchangeably throughout this disclosure.

Display window 14A is a player stage, or a graphical user interface element generated by the media application on an area of touchscreen 12, in which the media application displays the video content or video output. The video content being shown in display window 14A is depicted in a simplified view that includes a character 15A that may be part of a personally produced video, a movie, a television show, an advertisement, a music video, or other type of video content. The video content may be provided by a media application, which may also provide an audio output synchronized with the video output. The video content as depicted is merely an example, and any video content may be displayed by the media application. The media application may, for example, be the mobile YouTube application, or app, provided by Google Inc. of Mountain View, Calif. and its subsidiary, YouTube, LLC of San Bruno, Calif., and which may be any of a number of versions for running on different mobile operating systems. The media application may source the video content from any of a variety of sources, including streaming or downloading from a server or data center over a network, or playing a video file stored locally on computing device 10.

Touchscreen 12 may be a presence-sensitive screen, in that it is enabled to detect touch inputs from a user, including gesture touch inputs that include motion with respect to the presence-sensitive screen, and translate those gesture touch inputs into corresponding inputs made available to the operating system and/or one or more applications running on the device. Various embodiments may include a touch-sensitive screen configured to detect touch gesture inputs, or other types of presence-sensitive screen such as a screen device that reads gesture inputs by visual, acoustic, remote capacitance, or other type of signals, and which may also use pattern recognition software in combination with user input signals to derive program inputs from user input signals. Display window 14A is depicted in a simplified form in FIG. 1, including a triangle icon 17, which may be displayed as a graphical user interface icon equivalent of a "play" button, that may be displayed by the media application on top of or in place of a frame of ordinary video content while the video content is paused, or is just in the process of being opened or is otherwise buffering, for example.

In this example, during playback of the video content on display window 14A, computing device 10 may accept a touch input in the form of a tap input, with a simple touch on touchscreen 12 without any motion along the surface of, or relative to, touchscreen 12. This simple tapping touch input without motion along the surface of touchscreen 12 may be contrasted with a gesture touch input that includes motion with respect to the presence-sensitive screen, or motion along the surface of the touchscreen 12. The media application may detect and distinguish between simple tapping touch inputs and gesture touch inputs on the surface of touchscreen 12, as communicated to it by the input detecting aspects of touchscreen 12, and interpret tapping touch inputs and gesture touch inputs in different ways. (Inputs and actions may be attributed to computing device 10, throughout this disclosure, with the understanding that various aspects of those inputs and actions may be received or performed by touchscreen 12, the media application, the operating system, or any other software or hardware elements of or running on computing device 10.)

In the example of FIG. 1, the media application also displays a timeline 16 and a scrubber 18 that occupies a position along timeline 16 that indicates a corresponding proportional position of the currently displayed video frame relative to the entire duration of the video content. The media application's user interface elements may configure the timeline 16 and scrubber 18 to fade away during normal playback of the video content, and to reappear when any of a variety of touch inputs are detected on touchscreen 12. In other examples, the media application may have a timeline and/or scrubber and/or play button icon that have different positions than those depicted here or that function differently from what is described here.

Scrubber 18 may be selected by a touch input on scrubber 18 on touchscreen 12 and manually moved along the timeline to jump to a different position within the video content. Finding and successfully manipulating the scrubber 18 on the timeline 16 can be challenging on a mobile device, particularly a smartphone, where the touchscreen 12 has a constrained size.

Figure 2:
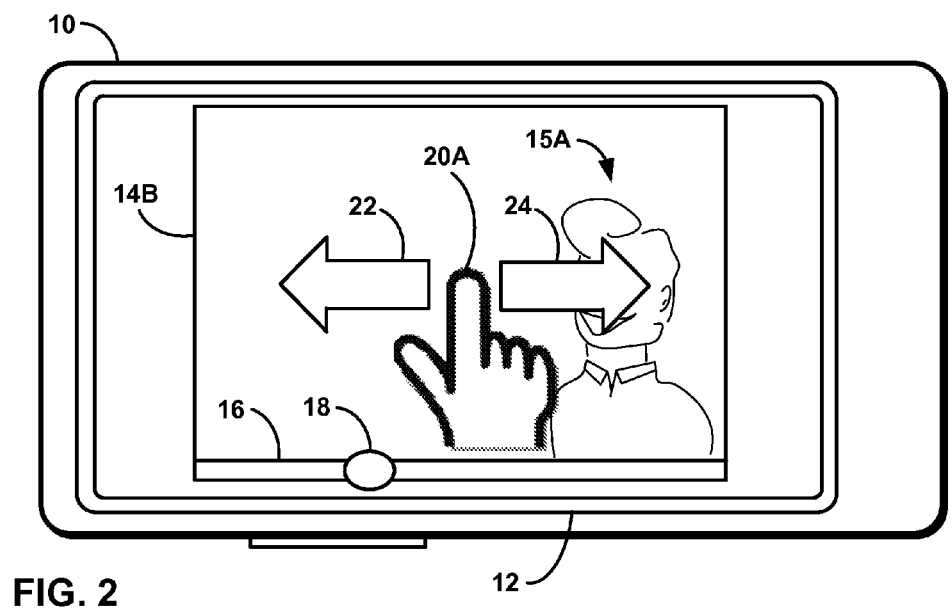
FIG. 2 is a conceptual diagram depicting an example computing device receiving a gesture touch input for controlling the motion of a video output on a touchscreen, in accordance with an illustrative example.

FIG. 2 depicts example computing device 10 receiving a gesture touch input for controlling the motion of a video on a touchscreen, in accordance with an illustrative example. A user's finger 20A is extended to contact touchscreen 12 within display window 14B provided or rendered by the media application running on computing device 10. (Display window 14B is the same as display window 14A as indicated in FIG. 1 except that the momentary image currently being rendered on the display window is different or is changing in the view as depicted; other variations in the momentary rendering of the display window are indicated with the number 14 followed by a different letter in subsequent figures.) The user may therefore enter a gesture touch input directly in the display window 14B that comprises the video content. That is, the user may enter a gesture touch input directly on an area of touchscreen 12 where the video content is being displayed.

Scrubber 18 is in the same position on timeline 16 as depicted in FIG. 1. The user may initially contact the touchscreen in one position, as shown with the position of finger 20A as depicted in FIG. 2, but then move the finger 20A laterally along the surface of touchscreen 12, so that the finger 20A retains contact with touchscreen 12 while in motion with respect to touchscreen 12, thereby forming a gesture touch input on touchscreen 12. This gesture touch input may be referred to as a swipe or a swiping gesture.

The user may make a swiping gesture toward the left side of the touchscreen 12, as depicted at arrow 22, or toward the right side of the touchscreen 12, as depicted at arrow 24. Arrows 22 and 24 are therefore intended as abstract representations of the motion of the user's finger 20A relative to touchscreen 12, thereby forming a gesture touch input. As depicted in FIG. 2, the user may swipe her finger 20A over the portion of touchscreen 12 in which character 15A appears within the video content currently being displayed in display window 14B, in the case of a rightward swiping gesture depicted at 24. Computing device 10 responds to these swiping gesture inputs by fast forwarding or rewinding the video content, in this example.

The media application running on computing device 10 therefore uses these swiping gesture touch inputs, as represented by the motion of the user's finger 20A in the directions of arrows 22 or 24, as inputs to initiate a rewinding or a fast forwarding of the video content. Specifically, a swiping gesture touch input in the direction of arrow 22 may initiate a fast forwarding of the video content, while a swiping gesture touch input in the direction of arrow 24 may initiate a rewinding of the video content, in this example, although in other examples, the reverse may be used, or any other direction or type of gesture touch inputs may be used to initiate rewinding or fast forwarding of the video output or video content. The media application may also synchronize an audio output with the video output during the rewinding or fast forwarding of the video output.

While the description above refers to swiping gestures toward the "left" side and the "right" side of touchscreen 12, it will be well-understood that the left and right sides of touchscreen 12 may be relative to the orientation of computing device 10 or of the video output from the media application. Computing device 10 may incorporate sensors that detect its orientation and it may present the video output in a corresponding orientation to be right-side-up for the user. This context-dependent orientation may also be incorporated for the gesture touch inputs, so that the gesture touch inputs remain intuitive for the user and a leftward swiping gesture, i.e. a touch input with a leftward motion across touchscreen 12, always initiates a fast forwarding of the video output, and a rightward swiping gesture, i.e. a touch input with a rightward motion across touchscreen 12, always initiates a rewinding of the video output (or whatever other relation between gesture touch inputs and motion control of the video output is in use), regardless of the orientation of computing device 10. Or in other examples, as indicated above, the opposite input relation may be implemented, so that a gesture touch input with a leftward motion across touchscreen 12 initiates a rewinding of the video output, and a gesture touch input with a rightward motion across touchscreen 12 initiates a fast forwarding of the video output.

Therefore, touchscreen 12 may have a current left-right orientation at a particular time when touchscreen 12 receives the gesture touch input, and rewinding or fast forwarding the video output based at least in part on the gesture touch input includes rewinding the video output in response to the gesture touch input having a motion toward a right side of touchscreen 12 in the current left-right orientation, and fast forwarding the video output in response to the gesture touch input having a motion toward a left side of touchscreen 12 in the current left-right orientation. Gesture touch inputs that are not very directly leftward or rightward, or otherwise relatively ambiguous, may still be interpreted by measuring and accepting the overall component of motion along the left-right axis of touchscreen 12. A threshold of sufficient ambiguity of direction, or of motion in general, such as if the detected motion has a relatively very minor total displacement across the real estate of touchscreen 12, may also be imposed so that sufficiently short or ambiguous touch inputs are not translated into controls to initiate a rewind or fast forward, in various examples.

Any of various aspects of interpreting the swiping gesture touch inputs, translating those inputs into rewind or fast forward inputs for the media application, re-orienting the video output and the orientations for the gesture touch inputs in response to a re-orienting of the computing device 10, may be handled by the media application itself, by software specific to reading touch inputs on the touchscreen 12, by the operating system of the computing device 10, or by any combination of the operating system and/or other software running on computing device 10 or on computing resources accessible to computing device 10.

Computing device 10 may therefore execute the media application that provides the video output to touchscreen 12 such that touchscreen 12 is enabled to receive a gesture touch input that has motion with respect to touchscreen 12, and rewind or fast forward the video output based at least in part on the gesture touch input. Computing device 10 may perform these functions, or a portion of them, by a method implemented in the media application, for example. This media application may be bundled with or optimized for the operating system in an initial configuration of the computing device 10. The media application may be made be available for downloading onto computing device 10, either from a vendor of the operating system, or from a third party. Computing device 10 may also perform these functions, or a portion of them, by a feature implemented in the operating system configured to execute on computing device 10, in various examples. In this example, this feature of the operating system may be configured to detect and interpret gesture touch inputs and other touch inputs on touchscreen 12, and to communicate data about the gesture touch inputs and other touch inputs to a separate media application.

Figure 3:
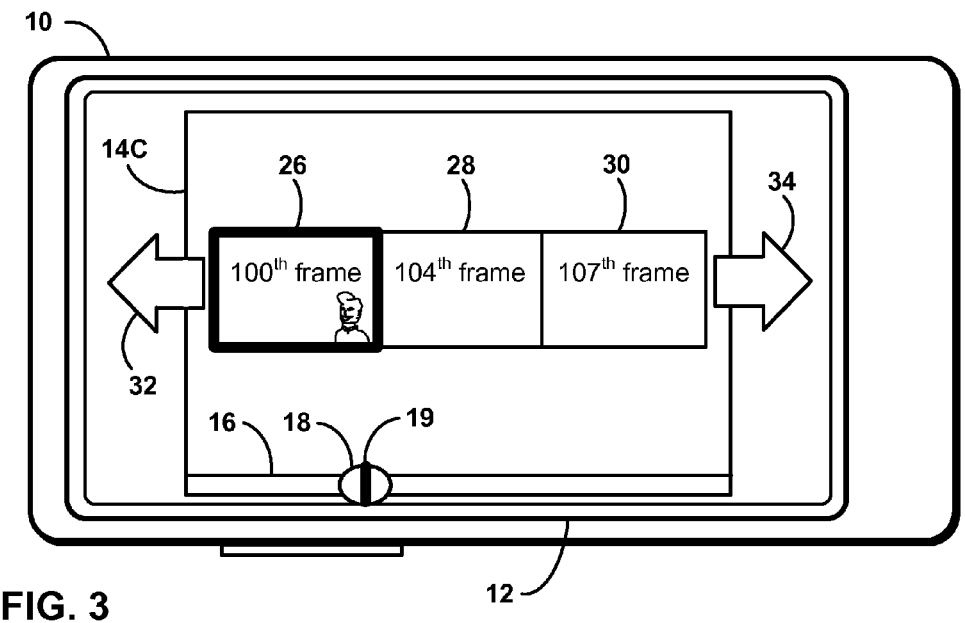
FIG. 3 is a conceptual diagram depicting an example computing device displaying sample frames of video content in a carousel view during a fast forward, in accordance with an illustrative example.

FIG. 3 depicts computing device 10 displaying sample frames 26, 28, 30 of video content in a carousel view during a fast forward, in accordance with an illustrative example. This carousel view may or may not be used in conjunction with the swiping gesture controlled rewinding and fast forwarding as discussed above. In this carousel view example, when the user initiates a swiping gesture touch input as depicted in FIG. 2, computing device 10 also shrinks the currently displayed frame of the video output, and displays it in a sequence along with additional frames of the video output. As depicted in FIG. 3, the frame of the video output that had been displayed in FIGS. 1 and 2 may be the 100th frame of the video output, depicted in shrunken form as frame 26 in FIG. 3. Computing device 10 may, for example, render the graphics of display window 14C in such a way that it provides a fluid transition from the regular playback view to shrinking of the original frame 26 at the same time as initiating the rewinding or the fast forwarding of the video content in the form of the frame carousel, and without causing any delay in the initiating of the rewinding or fast forwarding.

The media application also currently renders display window 14C such that the 104th frame, depicted at 28, and the 107th frame, depicted at 30, appear in sequence with the 100th frame, in a carousel or film reel type view. (While these are described as the 100th, 104th, and 107th frames, these are merely representative numbers, with the understanding that any number of frames including high numbers of frames are likely to be common in video outputs.) In this example, the media application may also render the original frame 26 with highlighting, a darker outline, a different color, or some other visual indication (depicted here as a bold outlining) for the user's reference, to give the user context relative to the other frames being depicted. The position of the scrubber or playhead 18 corresponding to the position of the original frame 26 may also be marked with a highlighted line 19 or other positional indication in or around timeline 16, also to give the user reference or context as the frame reel moves away from the position at which the fast forward or rewind was initiated.

The view of display window 14C as depicted in FIG. 3 is intended as a momentary snapshot during the fast forwarding of the video output, with the carousel or reel of frames 26, 28, 30 moving leftward, in the direction of arrow 32. FIG. 3 also depicts a representative set of frame intervals between the frames. The frame intervals may be different in different examples, and may be based on the speed of the gesture touch input in various examples. In one example, the frame interval may decrease over time until it dwindles to no interval, absent a subsequent user input, at which point the device may resume normal playback, for example. In other examples, the frame interval may remain constant, or may increase over time. The frame carousel itself may move at a constant rate, or at a decreasing rate, and in either case, may be combined with a frame interval that is constant over time, or that decreases over time. The speed of the frame carousel may also be proportional to the speed of the gesture input or otherwise a function of the speed of the gesture input. The speed of the gesture input may therefore be used to influence the frame interval, the speed of motion of the frame carousel, neither, or both, in different examples.

Arrows 32 and 34, as with arrows 22 and 24 in FIG. 2, are intended as abstract indications of the motion of the sequence of frames, and not as part of the video output being rendered in display window 14C or otherwise on touchscreen 12. Arrow 34 shows the direction of motion of the sequence of frames 26, 28, 30 in the alternative case in which a leftward swiping gesture touch input had been made, initiating a rewinding of the video output rather than a fast forwarding. During the rewinding or the fast forwarding of the video output, therefore, computing device 10 concurrently displays a plurality of frames of the video output on the touchscreen 12, in lateral motion corresponding to the rewinding or fast forwarding.

FIG. 3 representatively shows the 104th and 107th frames after the 100th for a couple of specific reasons. In this example, because the video output is being fast forwarded, an intermittent selection of the frames of the video output are rendered by the media application in the carousel view in display window 14C as the sequence of frames passes by. The 104th and 107th frames are representative intermittent frames selected from among all the frames in a continuous sequence that the media application is fast forwarding through. Additionally, there is a smaller gap in number of frames, i.e. a smaller frame interval, between the 104th and 107th frames as there is between the 100th and 104th frames. This is indicative of the frame interval, i.e. the intermittency between displayed frames, growing smaller over time corresponding to the fast forward slowing down over time, and which may continue to slow down so that the frame interval, i.e. the number of omitted frames between rendered frames, drops over time from three, to two, to one, and finally to zero before the frame carousel comes to a rest (assuming lack of other user input in the meantime). That is, the motion of the sequence of frames may be rendered in such a way as to imitate friction, as an intuitive user interface feature.

The swipe gesture touch input therefore respects a "finger motion physics" user experience for scrolling the frame carousel, with an eventual slowdown of the scrolling action. This user interface feature may be implemented by the mobile operating system running on computing device 10, by the media application, or in part by aspects of both or any other combination of the operating system and other software running on computing device 10. In other examples, the intermittency rate may alter over time with some other pattern, and the frame carousel may come to rest before the intermittency rate or frame interval drops to the point of omitting a certain minimum number of frames. Computing device 10 may also enable a user to enter a simple input to undo the fast forwarding or rewinding, in case the user changes her mind or initiated the fast forwarding or rewinding by accident. For example, computing device 10 may enable the user to tap a region of the display window 14C outside of the video frames, and computing device 10 may accept this outside tap as an input for undoing the fast forwarding or rewinding and returning to normal play resuming from the frame at which play was interrupted.

In the example as depicted in FIG. 3, the frame speed, i.e. the speed of the motion of the sequence of frames 26, 28, 30, and additional frames rendered in the carousel view, may therefore slow down over time, and may eventually stop, unless it is reset by a subsequent gesture touch input. In other examples, the friction-emulating user interface feature may be omitted, and the fast forwarding or rewinding may progress indefinitely until interrupted by a subsequent input, or by reaching the end (or beginning for a rewind) of the video content, in the style of rewinding or fast forwarding of a video on a traditional VCR, DVD player, or Blu-Ray player. In these examples, the concurrently displayed frames may be displayed with a frame interval that is held constant until interrupted by a subsequent user input, or until the video content runs out of frames to display.

The frame speed may also be determined based at least in part on the speed of the swiping gesture touch input. The computing device 10 may determine the speed of the motion of the gesture touch input when the user swipes her finger 20A across the touchscreen 12 (as shown in FIG. 2). The computing device 10 may then rewind or fast forward the video output at a frame speed based on the determined speed of the motion of the gesture touch input. The frame speed based on the determined speed of the motion of the gesture touch input in the sense that it is based at least in part on the determined speed of the motion of the gesture touch input, as well as being based at least in part on other factors such as a constant of proportionality between the two, a relation of proportionality between the two, a range of speeds bound by a minimum and/or a maximum frame speed, or other factors. The resulting variation in frame speed is illustrated between FIGS. 3 and 4A.

Figure 4A:
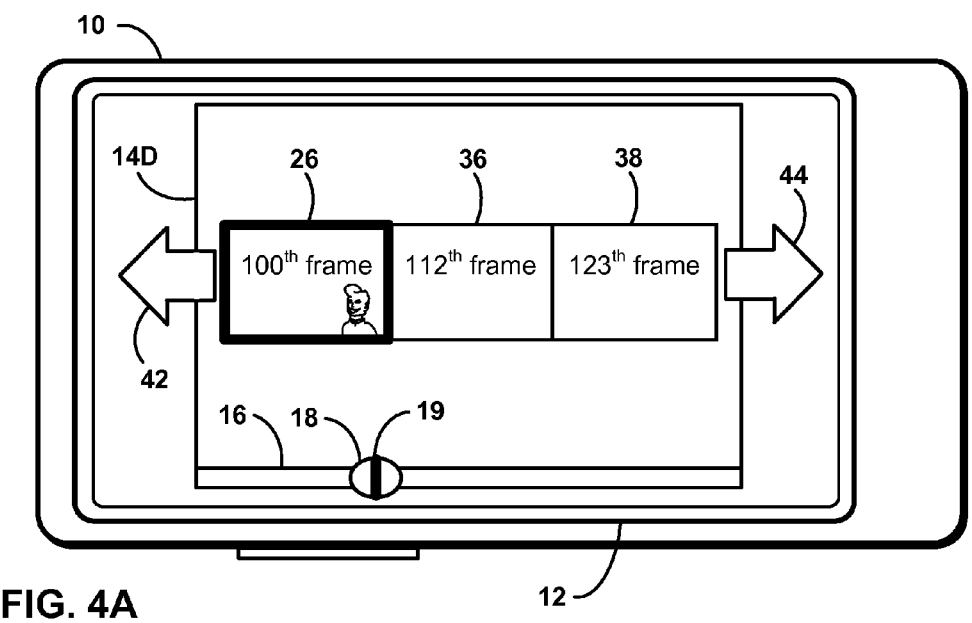
FIG. 4A is a conceptual diagram depicting an example computing device displaying sample frames of video content in a carousel view during a fast forward, at a higher frame speed than in FIG. 3, in accordance with an illustrative example.

FIG. 4A depicts computing device 10 displaying sample frames 26, 36, 38 of video content in a carousel view during a fast forward, at a higher frame speed than in FIG. 3, in response to a faster swiping gesture touch input, in accordance with an illustrative example. Frame 26 is the 100th frame as in FIG. 3, while frames 36 and 38 are the 112th and 123rd frames, respectively. The media application therefore skips many more frames in between the representative sample frames rendered within the moving carousel view in this example, than in the example depicted in FIG. 3 and described in reference thereto. In particular, the media application renders the frame carousel with skipping over eleven frames at a time at first, then with the number of frames being skipped over between rendered frames dropping to ten frames, then nine, and so forth.

This much higher intermittency rate can be used with a frame carousel that is moving at the same rate as with a lower intermittency rate and still have a faster frame speed, since it is sampling its way through the frames of the video content at a much faster rate. This allows faster fast forward or rewind speeds while still keeping the apparent motion of the frame carousel at a speed low enough to allow a user to glimpse the content of individual frames, so the user can still evaluate individual frames to decide whether she has fast forwarded or rewound the video content to a desired segment. Keeping the apparent carousel speed relatively moderate may also pose a relatively easier burden on the graphics rendering capabilities of the computing device 10, particularly if the device is relatively underpowered in its graphics rendering capability. In other examples, the media application may render the frame carousel with the same intermittency rate but with faster apparent motion to achieve a faster frame speed, or may use some combination of higher intermittency rate and faster apparent motion to achieve faster frame speed, in response to faster swiping gesture touch inputs.

In various examples, the media application may also use initial intermittency rates with any number of skipped frames between rendered frames, from only one or two skipped frames, to between three and eleven (i.e., between the initial intermittency rates depicted in FIGS. 3 and 4A), or any number above eleven. In various examples, the media application may also reduce the number of skipped frames between rendered frames at any rate. While FIG. 3 depicts the number of skipped frames dropping from three to two within the span of just three frames, and FIG. 4A depicts the number of skipped frames dropping from eleven to ten (i.e. between the 100th frame and 112th frame, then between the 112th frame and the 123rd frame) also within the span of just three frames, the media application may render two frames, or ten, or a hundred, or any other number in a row, before altering the number of skipped frames between rendered frames during the motion of the frame carousel corresponding to the rewinding or fast forwarding of the video content.

FIG. 4A also depicts arrows 42 and 44 as abstract indications of the motion of the frame carousel corresponding to either rewinding or fast forwarding of the frame carousel, as in FIG. 3, and are not intended as part of any image rendered by computing device 10 on touchscreen 12. The depiction of display window 14D is intended as an instantaneous snapshot just after a fast forwarding has been initiated, such that the same frame 26 that was being rendered at full size right at the moment when the user made the swiping gesture touch input is still visible (and just about to pass leftward out of the view rendered on display window 14D), and scrubber 18 has not yet had time to move appreciably along timeline 16 from the position it occupied at the moment when the user made the swiping gesture.

Computing device 10 may also base the frame speed, or at least the initial the frame speed, of the rewinding or fast forwarding on the speed measured for the gesture touch input in a variety of different ways. In one implementation, computing device 10 may cause the frame speed to be directly proportional to the speed measured for the gesture touch input, so that the frame speed rises proportionally to the speed of the gesture touch input across the surface of touchscreen 12 in a directly linear way. In another implementation, computing device 10 may cause the frame speed to be exponentially proportional to the speed measured for the gesture touch input. In this case, a moderately slow gesture touch input across the surface of touchscreen 12 may result in only a very slow frame speed, while only a moderately fast gesture touch input across the surface of touchscreen 12 results in a fast frame speed, and a fast gesture touch input causes an extremely fast frame speed. This implementation may make it easier for the user to learn to select anywhere from very slow to extremely fast frame speeds across a relatively narrow range of gesture touch input speeds. In still another implementation, the frame speed may be directly proportional to the speed measured for the gesture touch input in a first part of a range of possible speeds for the gesture touch input, while the frame speed is exponentially proportional to the gesture touch input speed in a second part of the range of possible speeds for the gesture touch input. Any of these implementations may be exclusive, or a default setting, or may be freely selectable by the user.

Figure 4B:
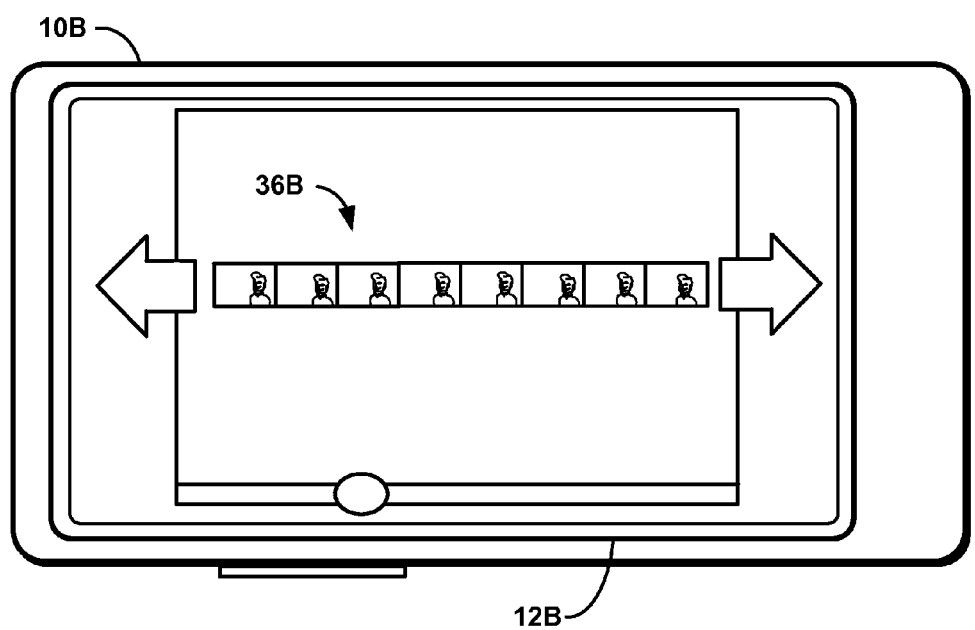
FIG. 4B is a conceptual diagram depicting another example computing device displaying sample frames of video content in a carousel view during a fast forward, in accordance with an illustrative example.

FIG. 4B depicts another computing device 10B displaying sample frames 36B of video content in a carousel view during a fast forward, in accordance with another illustrative example in which a larger number of frames is displayed at one time on touchscreen 12B. Computing device 10B may be a device with a larger touchscreen 12B, such as a tablet computing device, and may be able to display many more frames at the same time than a smaller computing device, such as a smartphone. The media application may render the frame carousel to display the plurality of frames of the video output with a frame size such that at least a minimum number of the frames are displayed concurrently. For example, the media application may render the frame carousel with a default frame size for each frame, which may be selected so that computing devices with a minimum anticipated screen size display at least three frames at a time, while devices with larger screens will display a proportionally larger number of frames at any one point in time. Alternatively, the media application may detect the display size of the particular device on which the media application is executing or on which its output is to be rendered, and adjust the frame size of the frames in the carousel or frame reel within parameters based on the display size. The media application may also enable the frame size to be adjusted based on user-selected options. For example, on a device with a relatively larger display such as computing device 10B in FIG. 4B, the media application may enable user configuration options for a user to select for either a small number of relatively large frames to be displayed concurrently (e.g., at least two, three, or four frames concurrently) or for a larger number of proportionally smaller frames to be displayed concurrently during the motion of the frame carousel across the screen during a fast forward or rewind of the video. This is one example of providing user-selectable frame size options, and displaying the plurality of frames of the video output with a frame size that is based at least in part on a user input to the user-selectable frame size options.

In various examples, computing device 10 or 10B (which may be collectively referred to hereafter as computing device 10) may therefore display a sequence of frames from a video application concurrently, with different frames rendered on different portions of a display at the same time, and in which the sequence of frames may be rendered with an apparent motion across the display. Each frame in the sequence may appear at one end of the frame carousel on one side of the display, propagate in apparent motion within the frame sequence across the display, and apparently disappear off the opposite side of the display. At each point in time during the rendering of the frame carousel, the computing device 10 renders different frames from the video sequence concurrently in different portions of the display. Over time, computing device 10 adjusts the position in which each of the frames is rendered, thereby creating the impression of each of the frames moving across the display from one side to the other. This illustrates one way in which computing device 10 may display, during the rewinding or fast forwarding of the video output, a plurality of frames of the video output concurrently on the presence-sensitive screen in lateral motion corresponding to the rewinding or fast forwarding. The lateral motion of the frames across the display intuitively suggests to the user the fast forwarding or rewinding of the video output, as one example of how the lateral motion of the frames corresponds to the fast forwarding or rewinding of the video output.

Figure 5:
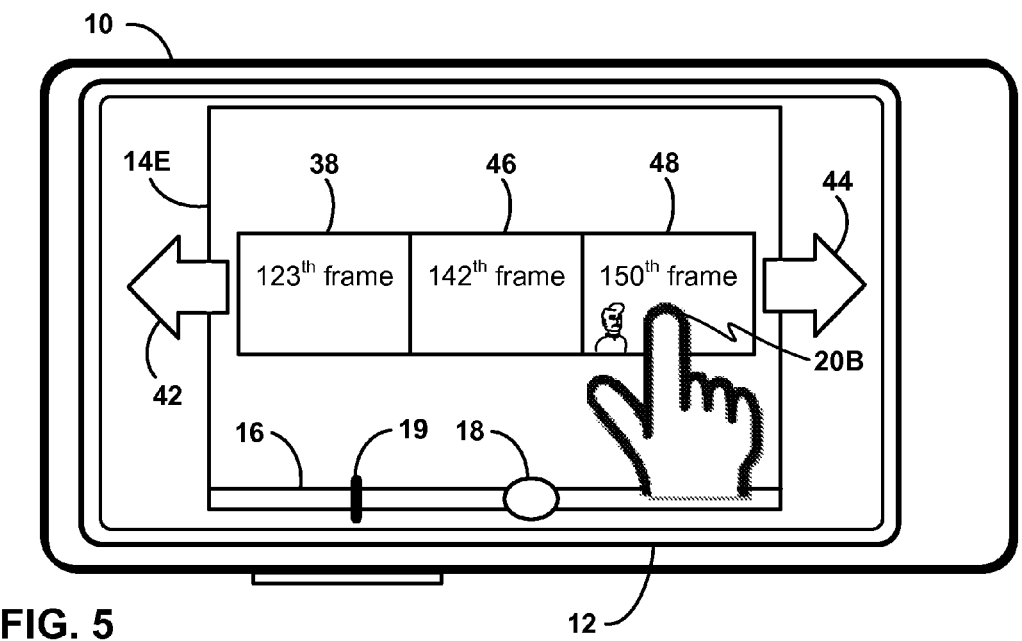
FIG. 5 is a conceptual diagram depicting an example computing device receiving a gesture touch input on a touchscreen to select a frame of video content in a carousel view at which to return to normal playback, in accordance with an illustrative example.

FIG. 5 depicts computing device 10 receiving a new gesture touch input on touchscreen 12 to select a frame of video content in the carousel view at which to end the fast forwarding and return to normal playback of the video output, in accordance with an illustrative example. At this moment, computing device 10 renders display window 14E shortly after the fast forwarding with the relatively higher frame speed as depicted in FIG. 4A. The 123rd frame, frame 38, which appears on the right side of display window 14D in FIG. 4A, now appears at the left side of display window 14E in FIG. 5 (so the user has not left the video fast forwarding for very long). To the right of frame 38 in the sequence of frames depicted in the carousel view, are the 142nd and 150th frames of the video content, i.e. frames 46, 48 respectively as referenced in FIG. 5. Scrubber 18 is also depicted having moved some way to the right along the continuum of timeline 16, independently indicating that a later point in the video content has been reached. (In other implementations, timeline 16 and scrubber 18 may be omitted, or other types of representation of progress through the video content may be displayed.) Arrows 42 and 44 are abstract indications of motion of the frame carousel, as with the previous figures. Arrow 42 shows the direction of motion of individual frames of the frame carousel during the fast forwarding of the video, while arrow 44 shows the direction of motion the frames in the frame carousel would take if the frame carousel were put into a rewind.

As shown in FIG. 5, the user has once again placed her finger 20B in contact with touchscreen 12 to enter a touch input. This time, the user makes a simple tap, or tapping touch input, on a portion of touchscreen 12 in which one of the frames in the frame carousel is currently rendered—in particular, frame 48 (i.e., the 150th frame of the video output). Computing device 10 detects this tapping touch input and responds by stopping the fast forwarding of the video content, and stopping the corresponding apparent motion of the frame carousel as rendered in display window 14E, and returning to normal playback of the video content, as further depicted in FIG. 6.

Figure 6:
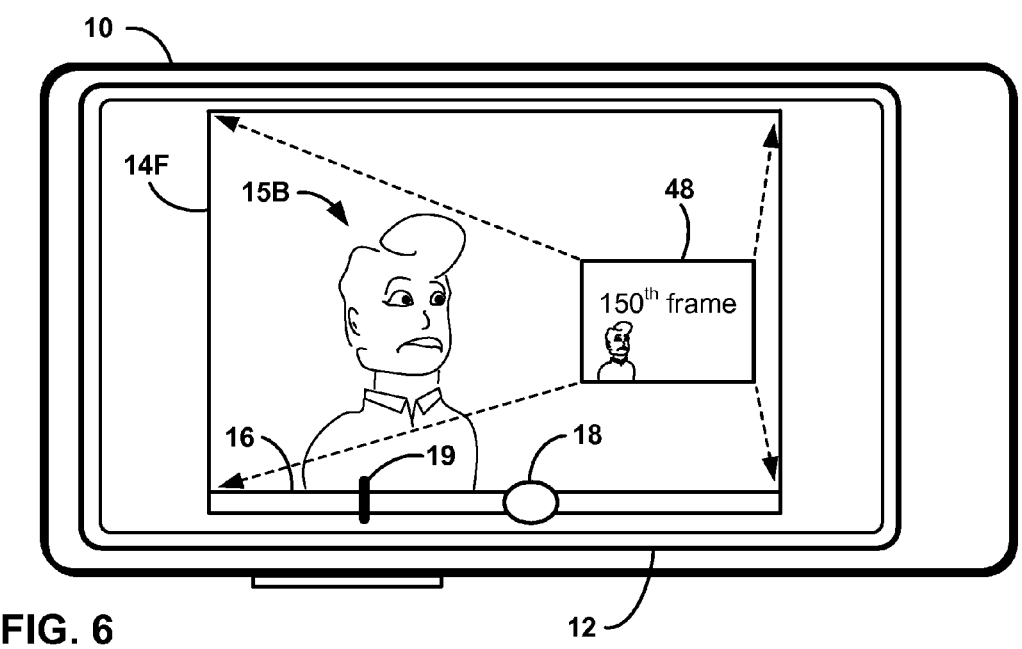
FIG. 6 is a conceptual diagram depicting an example computing device displaying video content on a touchscreen from a frame selected in FIG. 5, in accordance with an illustrative example.

FIG. 6 depicts computing device 10 displaying video content on touchscreen 12 starting from frame 48 as selected in FIG. 5, in accordance with an illustrative example. FIG. 6 depicts certain optional user interface behavior of the rendering in display window 14E of the transition from the fast forwarding frame carousel view back to a normal video playback mode. In particular, as shown in FIG. 6, computing device 10 (or the media application running on it) fades away the other frames in the frame carousel view and expands the rendering of frame 48 from the small or thumbnail rendering within the carousel view, up to the full size of display window 14E. Character 15B depicted in frame 48 (now seen in a different pose or different scene as when he appeared at 15A in the frame depicted in FIGS. 1 and 2), who could be seen in miniature in the reduced size of the carousel view in FIG. 5, expands into the full-sized rendering of the normal view.

The video output may then resume its normal playback from this point. The video output may either automatically resume normal play, or be in a paused state at this point, and require another tap input on the paused content to resume normal play, in different implementations. Computing device 10 may therefore receive a new touch input in the form of a stationary tapping touch input that lacks motion with respect to the touchscreen 12, and respond to this new touch input by interrupting or stopping the rewinding or fast forwarding of the video output and either pausing the video output or resuming normal playback of the video output. In the case of coming out of the carousel view in a paused state, computing device 10 may therefore also receive another tapping touch input that lacks motion with respect to touchscreen 12, and respond to this touch input by resuming normal playback of the video output.

As also shown in FIG. 6, scrubber 18 is in the same, more advanced position along timeline 16 as in FIG. 5, indicating the video content having advanced to a point further along in its running time. Computing device 10 may also respond to various touch inputs in various ways from the carousel view. For example, computing device 10 may allow a user to enter additional gesture touch inputs on touchscreen 12 during fast forwarding or rewinding to continue the fast forwarding or rewinding, to accelerate or decelerate the fast forward or rewinding, or to alternate between fast forwarding or rewinding or back and forth between them. Touchscreen 12 may therefore receive, at any time during rewinding or fast forwarding the video output, a subsequent gesture touch input that has motion with respect to touchscreen 12, and computing device 10 may then rewind or fast forward the video output based on that subsequent gesture touch input.

A user may rewind or fast forward a video output while the video output is being streamed or downloaded by computing device 10 over a network connection. If the fast forwarding surpasses the last cached frame, the frame carousel may stop at the last available frame and show an icon indicating that the video content is still loading. Computing device 10 may also actively arrange for a loading or caching order to facilitate fast forwarding while it is still in the process of streaming, downloading, caching, or buffering the video content, in various examples.

Computing device 10 may generate and provide predictions of one or more frames that are imminently pending to render for an interspersed display of frames in the frame carousel during the rewinding or fast forwarding of the video output. Computing device 10 may predict that a frame is imminently pending to render for the interspersed display of frames in the frame carousel if that frame is in order to be displayed within a relatively short period of time within a planned or predicted order in which computing device 10 plans on displaying the frames within the frame carousel. This may be in an intermittent order that corresponds to a "frictional" slowing down of the user interface physics emulation, or may be in an "inertial" rate that may have a constant intermittency rate. Specific measures of time considered imminent for this purpose may vary in different implementations, and may be measured in anything from less than one millisecond to several seconds or more, or may include anything from below the shortest period of time in which a human user is physically capable of noticing any change in her field of vision, to the total predicted period of time required to rewind or fast forward the entirety of the video content.

Computing device 10 may then modify the frame buffering process, such as by rearranging the order in which it buffers or caches frames of the video content, based on the predictions of the frames that are imminently pending to render to populate the frame carousel for the fast forwarding (or rewinding) of the video content. Computing device 10 may then cache or buffer the frames intermediate to those it caches for the frame carousel out of order, after the frames it caches to populate the frame carousel, in a way that optimizes between frames with which to populate the frame carousel during fast forwarding (and rewinding) and the remaining frames to populate the full video content from a point in the middle of the frame content at which the user may resume normal playback of the video content.

Figure 7:
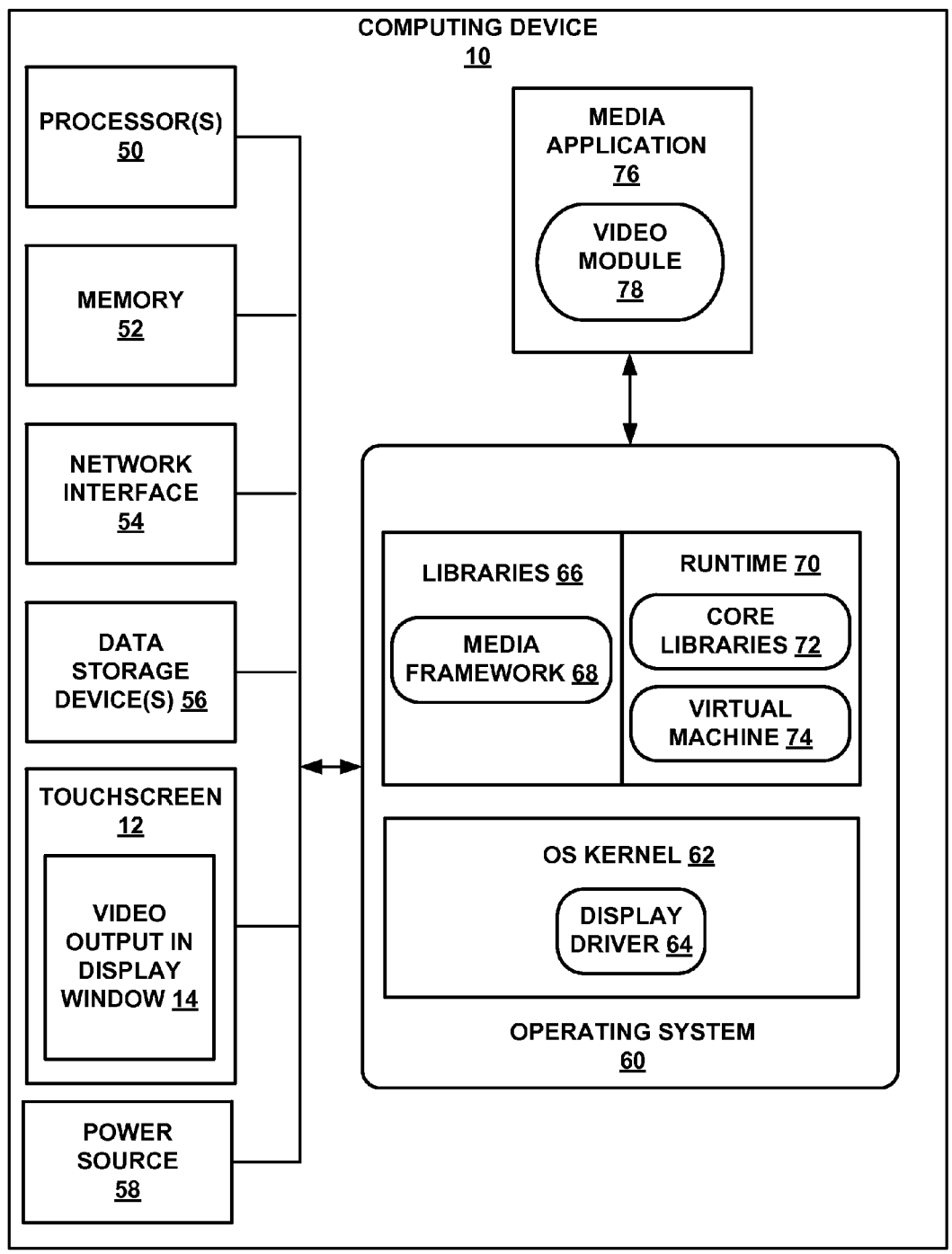
FIG. 7 is a block diagram illustrating further details of an example computing device that may implement gesture touch inputs for rewinding or fast forwarding video output on a touchscreen, in accordance with an illustrative example.

FIG. 7 is a block diagram illustrating further details of an example computing device 10 that may implement gesture touch inputs for rewinding or fast forwarding video output on a touchscreen 12, in accordance with an illustrative example. FIG. 7 illustrates only one particular example of computing device 10, and many other example embodiments of computing device 10 may be used in other instances. As shown in the example of FIG. 7, computing device 10 includes one or more processors 50, memory 52, a network interface 54, one or more data storage devices 56, touchscreen 12, and power source 58.

Computing device 10 may include operating system 60. Each of components 50, 52, 54, 56, 12, 58, 60 and 76 may be interconnected (physically, communicatively, and/or operatively) for inter-component communications. Operating system 60, in various examples, may control the operation of components of computing device 10. Computing device 10, in this example, further includes media application 76 that is also executable by computing device 10. Operating system 60, in one example, facilitates the interaction of media application 76 with processors 50, memory 52, network interface 54, data storage device 56, touchscreen 12, and power source 58. As shown in FIG. 7, media application 76 may include video module 78. Media application 76 and video module 78 may each include program instructions and/or data that are executable by computing device 10 or by a processor thereof. For example, media application 76 and/or video module 78 may include computer-executable software instructions that cause computing device 10 to perform one or more of the operations and actions described in the present disclosure. For example, operating system 60 and media application 76 may include code and/or data that are stored on one or more data storage devices 56 and that are read and executed or processed by one or more processors 50, and may in the process be stored at least temporarily in memory 52.

In this illustrative implementation of computing device 10, operating system 60 may include an operating system kernel 62, which may include various drivers, including display driver 64. Display driver 64 may process or handle certain fundamental or underlying functions for controlling what is displayed on touchscreen 12, including for displaying video output in a display window for media application 76, as well as for displaying user interface elements, including timeline 16, scrubber 18, and the frame carousel as depicted in FIGS. 1, 2, 3, 4A, 4B, 5, and 6. Operating system 60 may also interact with a set of libraries 66, which may include various more or less standard, specialized, and/or proprietary libraries, such as a media framework 68, which may also contribute to certain functions for controlling what is displayed on touchscreen 12.

In this illustrative implementation of computing device 10, operating system 60 may also interact with a runtime 70, which includes various core libraries of its own, as well as a virtual machine 74, which may be the Dalvik virtual machine in one example implementation. Virtual machine 74 may abstract certain lower-level aspects and properties of operating system 60, and allow higher-level applications to be run on top of virtual machine 74, so that software code in the higher-level applications is compiled into bytecode to be executed by the virtual machine 74.

For example, software for applications such as media application 76 may be written in C, which may be executable as native code by computing device 10, or may also be written in Java, then compiled to virtual machine-executable bytecode to be executed by virtual machine 74. As one illustrative example, libraries 66 may include the Standard C Library (libc), which provides native support for C functions. In different implementations, the operating system 60 and/or the virtual machine 74 may be able to execute code written in various other languages such as Objective-C, C++, JavaScript, Python, Ruby, Clojure, or Go, for example, either natively, or compiled into a virtual machine-executable bytecode, or compiled into an assembly language or machine code native to the CPU of computing device 10. Various examples may not use a virtual machine, and use applications that run natively on the computing device 10 or that use some other technique, compiler, interpreter, or abstraction layer for interpreting a higher-level language into code that runs natively on computing device 10.

In various examples, computing device 10 may also have various application programming interfaces (APIs) that are native to operating system 60 and that run on top of operating system 60, and which are intended to provide resources that automate or facilitate higher-level applications that access the one or more APIs. These one or more APIs may include object libraries or other libraries, toolsets, or frameworks, and may be associated with a native programming environment for writing applications. These may include a native API for detecting and interpreting gesture touch inputs and other touch inputs on touchscreen 12. In this example, media application 76 may be programmed in the native programming environment of an API or set of APIs that detect and interpret gesture touch inputs to touchscreen 12, and are configured to interpret gesture touch inputs for initiating a rewind or fast forward of the video output.

Higher level applications, such as media application 76, may therefore make use of any of various abstractions, properties, libraries, or lower-level functions that are provided by any of operating system 60, OS kernel 62, display driver 64, libraries 66, media framework 68, runtime 70, core libraries 72, virtual machine 74, or other compilers, interpreters, frameworks, APIs, or other types of resources with which computing device 10 is configured, to enable functions such as rewinding or fast forwarding a video output based on a gesture touch input, or rendering a rewinding or fast forwarding video frame carousel in response to such a gesture touch input.

Processors 50, in various examples, may be configured to implement functionality and/or process instructions for execution within computing device 10. For example, processors 50 may be capable of processing instructions stored in memory 52 or instructions stored on data storage devices 56. Computing device may include multiple processors, and may divide certain tasks among different processors. For example, processors 50 may include a central processing unit, which may have one or more processing cores, and may also include one or more graphics processing units (GPUs). Processors 50 may be configured for multi-threaded processing. Processors 50 and/or operating system 60 may divide tasks among different processors or processor cores according to certain criteria, such as to optimize graphics rendering or to optimize the user experience. For example, processors 50 and/or operating system 60 may reserve a particular processing thread or processor or processing core, or a portion thereof, for certain tasks such as rendering translational motion of graphical elements, or for rendering still images or video frames within a video output.

As a more particular example, while computing device 10 is displaying a video frame carousel being rewound or fast forwarded such as described with reference to FIGS. 2, 3, 4A, 4B, and 5, computing device 10 may have a certain processing thread, processor, or processing core or a portion thereof reserved for the task of rendering the translational motion of the frame carousel across the touchscreen 12, and a different processing thread, processor, or processing core or a portion thereof reserved for the task of rendering the details of the images within each of the video frames 26, 28, 30, 36, 38, 46, 48, etc. as depicted in FIGS. 3, 4A, 4B, 5, and 6. Such a system for reserving certain high-priority processing resources for certain tasks may ensure that processing tasks where fast performance is important for effective user experience are not competing for processing time with less time-critical background tasks, especially during tasks that may impose a relatively high processing burden, which may include displaying a rewinding or fast forwarding video frame carousel.

Various tasks or portions of tasks may also be divided among different layers of software and hardware. For example, a processing thread may oversee higher-level management of video display, while being configured to push much of the processing burden of rendering the graphics through GPU hardware that is optimized for the task.

Memory 52, in various examples, may be configured to store information within computing device 10 during operation. Memory 52, in various examples, may be a computer-readable storage medium. In various examples, memory 52 is a temporary memory, and computing device 10 relies more on one or more data storage devices 56 than memory 52 for long-term storage. Memory 52, in various examples, may be a volatile memory, meaning that memory 52 does not maintain stored contents for a long duration of time once it is powered down, such as when computing device 10 is turned off. Examples of volatile memories that may characterize memory 52 include random access memories (RAM), dynamic random access memories (DRAM), static random access memories (SRAM), and other forms of volatile memories. In various examples, memory 52 may be used to store program instructions for execution by processors 50. Memory 52, in various examples, may be used by software or applications running on computing device 10 to temporarily store information during program execution.

One or more data storage devices 56, in various examples, may include a computer-readable storage medium or multiple computer-readable storage media. Data storage devices 56 may be configured to store larger amounts of information than memory 52. Data storage devices 56 may further be configured for long-term storage of information. In various examples, data storage devices 56 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. In other examples, memory 52 may also be configured for long-term data storage, and any of a variety of technologies may blur the lines between memory and data storage and between volatile and non-volatile. Memory 52 and data storage devices 56 may also include any of various caches, buffers, and other temporary memories that may be incorporated at any of various levels of a processing architecture and with various latency and capacity profiles, including a dedicated cache exclusive to a processing core or processing chip.

Computing device 10, in various examples, may also include a network interface 54. Computing device 10, in one example, utilizes network interface 54 to communicate with external devices via one or more networks, which may include one or more wireless networks. Network interface 54 may be or include a network interface card, such as an Ethernet card, an optical transceiver, a radio frequency transceiver, or any other type of component that is configured to send and receive information. Other examples of such network interfaces may include Bluetooth®, 3G and WiFi® radios configured for mobile computing devices, as well as USB. In various examples, computing device 10 may use network interface 54 to communicate wirelessly with an external device such as server device 84 of FIG. 8 (as described below), a mobile phone, or other networked computing device. In various embodiments, computing device 10 may also execute a gesture touch input controlled rewind and fast forward function for a video output solely from data stored internally to computing device 10 or input to computing device 10 from a local input device such as a USB player, Blu-Ray player, or DVD player, for example, without necessarily using a network connection and without streaming or downloading the video content from a server or remote data source.

Computing device 10, in various examples, may also include one or more input and/or output devices such as touchscreen 12, which is a presence-sensitive screen. Touchscreen 12, in various examples, may be configured to detect and receive input from a user through touch inputs on the surface of touchscreen 12, as well as to provide video output and other graphical output. Touchscreen 12 may incorporate any of various components to carry out these functions, which may include a liquid crystal display (LCD) display screen or display screen that uses another type of graphical output technology, as well as an electrically capacitive layer sensitive to the presence of touch and configured to translate the positions of touch inputs, and the motions of touch inputs as they change position over time, into signals to provide to a driver for the touchscreen or other feature for receiving the information on the touch inputs.

Computing device 10 may also include any of a variety of other input and/or output devices such as a speaker, a microphone, physical buttons (as opposed to virtual buttons rendered on touchscreen 12), a physical keyboard (as opposed to a virtual keyboard rendered on touchscreen 12), a mouse, a touchpad, a trackball, a voice user interface system, a camera, an accelerometer, a vibration component, a sound card, a video graphics adapter card, or any other type of device for detecting and/or interpreting inputs from a user or for converting a signal into a form of graphical, audio, tactile, or other form of user output that can be sensed by a user. Computing device 10 may also include one or more of any of these components.

Computing device 10, in various examples, may include one or more power sources 58, which may be rechargeable and provide power to computing device 10. Power source 58, in various examples, may be a lithium-ion battery, a nickel-cadmium battery, a nickel-metal hydride battery, or other suitable power source.

In various examples, all of or portions of media application 76 and/or video module 78 may be a part of or native to operating system 60, libraries 66, and/or runtime 70. In various examples, media application 76 may receive input from one or more data storage devices 56, and/or through network interface 54 of computing device 10. Computing device 10 may, for example, receive video content through network interface 54 from a network-connected server device, such as is shown in FIG. 8.

Figure 8:
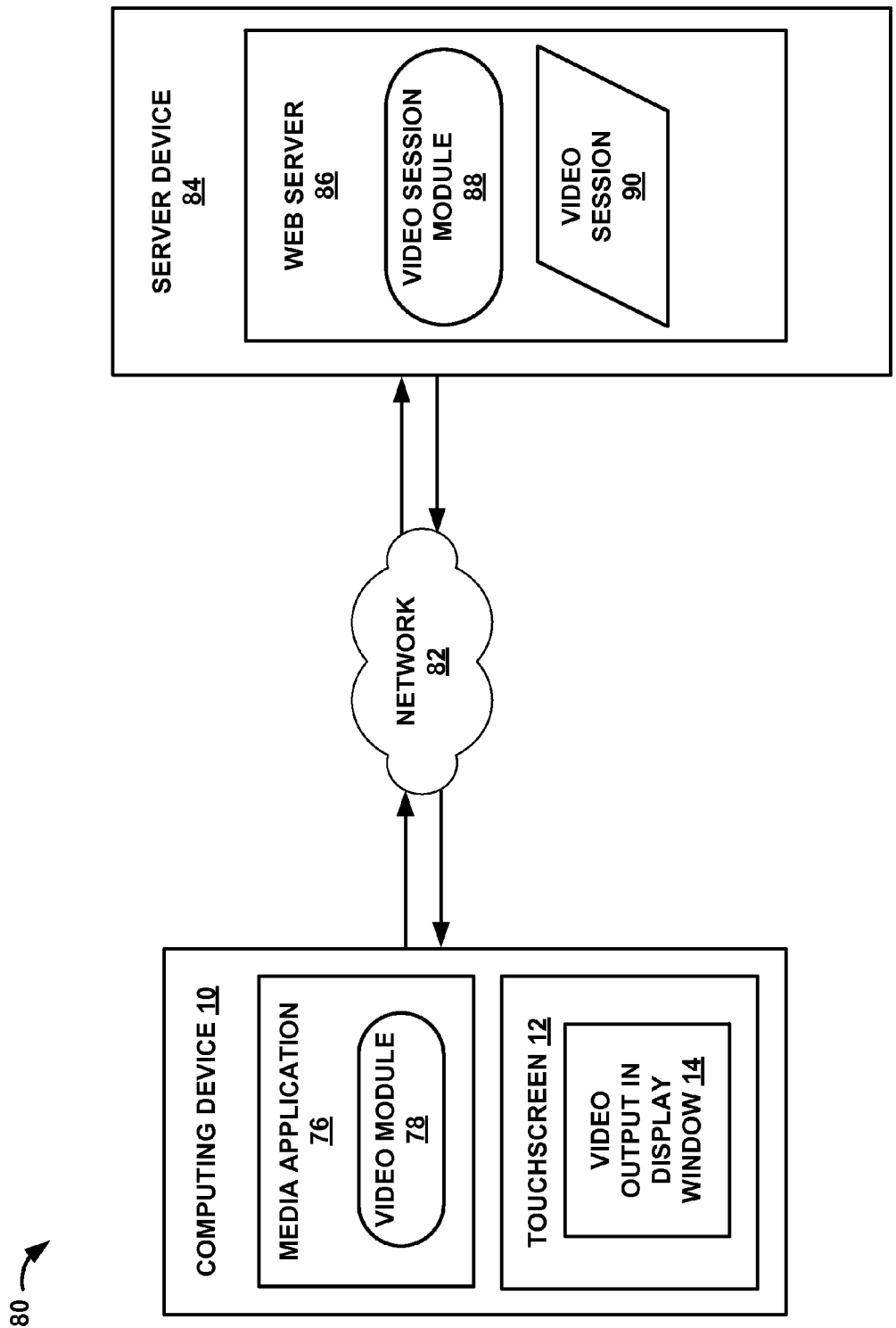
FIG. 8 is a block diagram illustrating an example of a system in which a computing device is communicatively coupled to a video session on a server device and displays video content streamed from the video session on a touchscreen, in accordance with an illustrative example.

FIG. 8 is a block diagram illustrating an example of a system 80 in which a computing device 10 is communicatively coupled to a video session 90 running in connection with a video session module 88 in a web server 86 on a server device 84, in accordance with an illustrative example. Computing device 10 receives streaming data for video content or a video output from video session 90 on server device 84 and displays the video output streamed from the video session 90 in display window 14 on touchscreen 12. Computing device 10 may buffer frames of the streaming video content data, and may buffer audio content that accompanies the video content in a media stream. Examples of computing device 10 may include, be, or be part of a mobile computing device (e.g., a mobile phone, netbook, laptop, tablet computer, portable gaming device, portable media player, e-book reader, or watch), other computing devices (e.g., a desktop computer, or set top box), televisions with one or more processors embedded therein or attached thereto, or a computing device having any other implementation or form factor.

As shown in FIG. 8, server device 32 includes web server 86, which may include video session module 88 and video session 90. As illustrated in FIG. 8, computing device 10 may communicate with server device 32 via network 82, which may be or include the Internet, a local area network (LAN), or other network, and which may incorporate any of a wide variety of servers, gateways, routers, other network nodes, and wired or wireless communication channels capable of sending and receiving data. Computing device 10 may thereby be operatively and/or communicatively coupled via network 82 to server device 84. Communication between computing device 10 and server device 84 over network 82 may incorporate a network connection using a Transmission Control Protocol and Internet Protocol (TCP/IP) protocol stack, or a User Datagram Protocol (UDP) network connection over IP, or other Internet Layer and Transport Layer protocols. Communication between computing device 10 and server device 84 over network 82 may also make use of any of a variety of Application Layer protocols on top of TCP or UDP for communicating the video and audio data as well as requests, responses, controls, and negotiating the connection, such as Real Time Streaming Protocol (RTSP), Real-time Transport Protocol (RTP), Real-time Control Protocol (RTCP), Hypertext Transfer Protocol (HTTP), and/or Hypertext Transfer Protocol Secure (HTTPS), for example.

Web server 86, as shown in FIG. 8, may perform one or more operations that enable media application 76 to access video session 90 to stream or download a video output onto computing device 10. Web server 86 may generate, manage, and terminate video sessions such as video session 90. In various examples, web server 86 may include one or more modules such as video session module 88 executing on server device 84. Video session module 88 may be involved in creating, managing, and terminating video sessions, such as video session 90.

Web server 86 may use any of a variety of tools or technologies for implementing the functions described herein. For example, web server 86 may use server-side JavaScript, and may use the V8 JavaScript engine developed by Google Inc. in conjunction with libraries for server-side JavaScript. Any action performed by any element or feature comprised in or running on server device 84 may in general be attributed to server device 84. Any of the functions of server device 84 described herein may also equivalently be abstracted among multiple servers, a data center, or a collection of servers and data centers.

In various examples, media application 76 on computing device 10 may include functionality to send an initiation request to server device 84 to create or initiate one or more video sessions such as video session 90. Server device 84 may automatically communicatively couple computing device 10 to video session 90 in response to receiving the initiation request. Computing device 10 may also send updated requests to server device 84 for changes in the order in which frames or other portions of a video output are to be sent or downloaded, based on the predictions of the one or more frames that are imminently pending to render for the interspersed display of frames, such as if a user enters a fast forward input early in the process of streaming and buffering the data for the video output.

In this case, computing device 10 may send an updated request for the server device 84 to send intermittently spaced frames from a large sample of the video output first, so that computing device 10 may render intermittently spaced frames from a large sample of the video output in a video frame carousel such as is depicted in FIGS. 2, 3, 4A, 4B, and 5, and to de-pioritize sending the remaining intermediate frames of video output or sending the audio output until after the video frame carousel is populated for fast forwarding or rewinding. Computing device 10 may continue sending updated requests to server device 84 with updated specifics of frames of video content to prioritize for downloading, based on ongoing user inputs and/or predictions made by computing device 10 for likely imminent user inputs based on prior user inputs. The term "downloading" in this context may refer to any form of communicating data from server device 84 to computing device 10 for streaming or downloading the video content and/or any other audio content or media content, such as when the media application provides the video output to touchscreen 12 while still downloading the video output from server device 84.

Server device 84 may then send signals including data for a streaming or downloading video output and a corresponding audio output from video session 90 to computing device 10. Server device 84 and/or computing device 10 may configure the streaming or downloading of data for the video output to optimize the delivery of the video output based, at least in part, on the hardware and/or software specifications and capabilities of computing device 10. For example, if computing device 10 is a mobile computing device with relatively higher or lower bandwidth and computing resource capabilities, communication server 34 may optimize the quality of the streaming video output sent to computing device 10 based on its particular bandwidth and computing resource capabilities.

Figure 9:
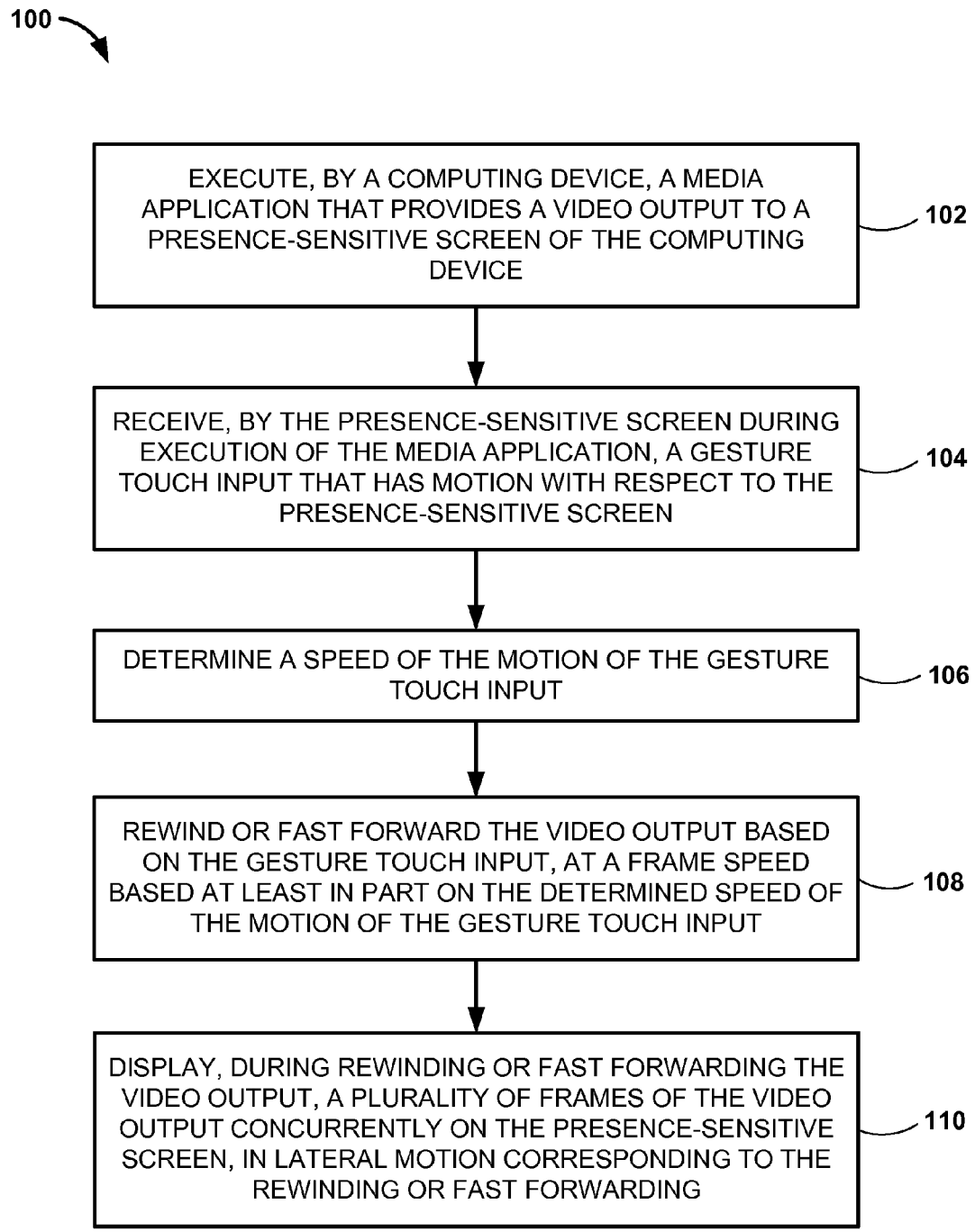
FIG. 9 is a flow diagram illustrating an example process that may be performed by a computing device to implement finger motion control inputs for video on a touchscreen, in accordance with an illustrative example.

FIG. 9 is a flow diagram illustrating an example process 100 that may be performed by a computing device, such as computing device 10 of FIGS. 1, 2, 3, 4A, 4B, 5, 6, 7, and 8, to implement gesture touch inputs for controlling the motion of a video output on a touchscreen, in accordance with an illustrative example. Process 100 is only one example, and other implementations may include more or fewer aspects than those depicted in FIG. 9. For purposes of illustration, the example process 100 is described within an example context involving computing device 10 and touchscreen 12 as depicted in FIGS. 1, 2, 3, 4A, 4B, 5, 6, 7, and 8.

In process 100, a computing device 10 may execute a media application that provides a video output to a presence-sensitive screen, i.e. touchscreen 12, of the computing device (102). During execution of the media application, the presence-sensitive screen receives a gesture touch input that has motion with respect to the presence-sensitive screen (104). Computing device 10 may optionally determine a speed of the motion of the gesture touch input (106). Computing device 10 rewinds or fast forwards the video output based on the gesture touch input, and may optionally do so at a frame speed based at least in part on the determined speed of the motion of the gesture touch input (108). During the rewinding or fast forwarding the video output, computing device 10 may also optionally display a plurality of frames of the video output concurrently on the presence-sensitive screen, in the frame carousel mode, in lateral motion corresponding to the rewinding or fast forwarding (110).

Various techniques described herein may be implemented in software that may be written in any of a variety of languages, making use of any of a variety of toolsets, frameworks, APIs, programming environments, virtual machines, libraries, and other computing resources, as indicated above. For example, software code may be written in Java, C, Objective-C, C++, Go, Python, Ruby, Scala, Clojure, assembly language, machine code, or any other language. As one specific illustrative example, aspects of the disclosure discussed above may be implemented in a software module written in Java that is executable on virtual machine 74 of FIG. 7, which may be the Dalvik virtual machine.

This software module may listen for touch input events from a module, application, driver, combination of one or more of these, or other software that manages the detecting and interpreting of touch inputs to touchscreen 12. This software module may execute a boolean method that performs evaluations of the touch inputs on touchscreen 12 and detects whether a touch input qualifies as a gesture touch input that has motion with respect to touchscreen 12. For example, the software may include an asynchronous event notification API that triggers an input event when a gesture touch input is detected. Different aspects of this detecting and interpreting may be divided among different layers of the software between the software that primarily manages touch inputs, and software that listens for touch input events and communicates them to the controls of media application.

In this example, if the boolean method detects a gesture touch input that has motion with respect to touchscreen 12, a scroller class that extends a video class is triggered to evaluate properties of the gesture touch input and to generate a rewind effect or a fast forward effect in the video class based on the properties of the gesture touch input. The rewind effect or fast forward effect in the video class may cause a rewinding or fast forwarding of the video output. The scroller class may also extend the video class to manipulate the frames of the video content to render the video frame carousel as depicted in FIGS. 2, 3, 4A, 4B, and 5.

The properties of the gesture touch input evaluated by the scroller class may include a direction of the gesture touch input, such as leftward or rightward. The properties evaluated by the scroller class may also include a speed and/or a duration of the gesture touch input. The video class may then generate either the rewind effect or the fast forward effect based on the direction of the gesture touch input. The video class may also generate the rewind effect or the fast forward effect with a scrolling speed based on one or more of the speed and the duration of the gesture touch input, in this illustrative example.

In this or other specific examples, aspects of the disclosure described above may be tailored to operate on the Android operating system developed by the Open Handset Alliance consortium, and may make use of and add new capabilities to Android media APIs such as android.media.MediaRecorder.VideoSource and android.media.MediaRecorder.VideoEncoder. Aspects of the disclosure may be equally applicable and implemented on any other operating system, and using any other APIs, frameworks, or toolsets. Aspects described herein for transmission, decoding, and rendering of data for video output or video content, which may be considered interchangeably herein with media output or media content that also includes audio output or audio content, may make use of any protocol, standard, format, codec, compression format, HTML element, or other technique or scheme for processing, decoding, rendering, or displaying a video output.

Various techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In various examples, an article of manufacture may comprise one or more computer-readable storage media.

In various examples, the data storage devices and/or memory may comprise computer-readable storage media that may comprise non-transitory media. The term "non-transitory" may indicate that the storage medium is not embodied in a carrier wave or a propagated signal. In certain examples, a non-transitory storage medium may store data that can, over time, change (e.g., in RAM or cache). Machine-readable code may be stored on the data storage devices and/or memory, and may include executable instructions that are executable by at least one processor. "Machine-readable code" and "executable instructions" may refer to any form of software code, including machine code, assembly instructions or assembly language, bytecode, software code in C, or software code written in any higher-level programming language that may be compiled or interpreted into executable instructions that may be executable by at least one processor, including software code written in languages that treat code as data to be processed, or that enable code to manipulate or generate code.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The various embodiments described above and depicted in FIGS. 1, 2, 3, 4A, 4B, 5, 6, 7, 8, and 9, as well as additional embodiments, are within the scope of the following claims.

What is claimed is:

1. A method comprising:
   outputting, by a computing device and for display, video content;
   receiving, during display of the video content, an indication of a gesture input that has motion with respect to a presence-sensitive input device operatively coupled to the computing device;
   determining, by the computing device, a speed of the motion of the gesture input;
   rewinding or fast forwarding, by the computing device, the video content in a direction corresponding to the motion of the gesture input, the rewinding or fast forwarding being at a speed based at least in part on the determined speed of the motion of the gesture input; and
   outputting, by the computing device and for display during the rewinding or fast forwarding of the video content, a virtual frame reel, the virtual frame reel comprising a plurality of frames of the video content displayed in lateral motion and in a direction corresponding to the rewinding or fast forwarding.

2. The method of claim 1, further comprising:
   selecting frames from the video content that are spaced apart from each other at an interval that is based on the determined speed of motion of the gesture input; and
   outputting the selected frames for display in the virtual frame reel.

3. The method of claim 2, further comprising:
   outputting for display, during rewinding or fast forwarding the video content, the virtual frame reel in lateral motion at a constant speed while outputting the selected frames for display in the virtual frame reel at the interval based on the determined speed of motion of the gesture input.

4. The method of claim 1, further comprising displaying the plurality of frames of the video content with a frame size such that at least a minimum number of the frames are displayed concurrently.

5. The method of claim 1, further comprising providing user-selectable frame size options, and displaying the plurality of frames of the video content with a frame size that is based at least in part on a user input to the user-selectable frame size options.

6. The method of claim 1, further comprising detecting a size of a screen, and rendering the plurality of frames of the video content with a frame size that is based at least in part on the size of the screen.

7. The method of claim 1, wherein the frame speed slows down over time unless it is reset by a subsequent gesture input.

8. The method of claim 1, wherein the frame speed is directly proportional to the speed measured for the gesture input.

9. The method of claim 1, wherein the frame speed is exponentially proportional to the speed measured for the gesture input.

10. The method of claim 1, wherein the frame speed is directly proportional to the speed measured for the gesture input in a first part of a range of possible speeds for the gesture input, and the frame speed is exponentially proportional to the speed measured for the gesture input in a second part of a range of possible speeds for the gesture input.

11. The method of claim 1, further comprising:
    receiving, by the computing device during rewinding or fast forwarding the video content, an indication of a subsequent gesture input that has motion with respect to the presence-sensitive input device; and
    rewinding or fast forwarding the video content based on the subsequent gesture input.

12. The method of claim 1, wherein the presence-sensitive input device comprises a presence-sensitive screen that has a current left-right orientation when the presence-sensitive input device receives the gesture input, and wherein rewinding or fast forwarding the video content based on the gesture input comprises rewinding the video content in response to the gesture input having a motion toward a right side of the presence-sensitive screen in the current left-right orientation, and fast forwarding the video content in response to the gesture input having a motion toward a left side of the presence-sensitive screen in the current left-right orientation.

13. The method of claim 1, further comprising:
receiving an indication of a second input that lacks motion with respect to the presence-sensitive input device; and
responding to the second input by interrupting the rewinding or fast forwarding of the video content and either pausing the video content or resuming normal playback of the video content.

14. The method of claim 13, further comprising:
pausing the video content in response to the second input;
receiving a third input, that lacks motion with respect to the presence-sensitive input device; and
responding to the third input by resuming normal playback of the video content.

15. The method of claim 1, further comprising:
providing a prediction of one or more frames that are imminently pending to render for an interspersed display of frames during the rewinding or fast forwarding of the video content; and
modifying a frame buffering process based at least in part on the prediction of the one or more frames that are imminently pending to render.

16. The method of claim 1, wherein the media application outputs the video content for display while still downloading the video content from a server device, the method further comprising:
providing a prediction of one or more frames that are imminently pending to render for an interspersed display of frames during the rewinding or fast forwarding of the video content; and
sending an updated request to the server device for a change in an order in which frames of the video content are to be sent, based on the prediction of the one or more frames that are imminently pending to render for the interspersed display of frames.

17. The method of claim 1, wherein the method is implemented as a feature of an operating system configured to execute on the computing device, and the feature of the operating system is configured to receive indications of gesture inputs and other inputs at the presence-sensitive input device, and to communicate data about the gesture inputs and other inputs to a separate media application.

18. The method of claim 1, further comprising:
executing a boolean method on the computing device that performs evaluations of indications of inputs via the presence-sensitive input device and detects whether an input qualifies as a gesture input that has motion with respect to the presence-sensitive input device; and
if the boolean method detects a gesture input that has motion with respect to the presence-sensitive input device, triggering a scroller class that extends a video class to evaluate properties of the gesture input and to generate a rewind effect or a fast forward effect in the video class based on the properties of the gesture input.

19. The method of claim 18, wherein the properties of the gesture input comprise a direction of the gesture input and one or more of a speed and a duration of the gesture input, and the video class generates either the rewind effect or the fast forward effect based on the direction of the gesture input, and generates the rewind effect or the fast forward effect with a scrolling speed based on one or more of the speed and the duration of the gesture input.

20. A method comprising:
detecting, by a computing device, a gesture input that has motion with respect to a presence-sensitive output device on which a video content is being displayed;
determining, by the computing device, a speed of the motion of the gesture input;
rewinding or fast forwarding, by the computing device, the video content in a direction corresponding to the gesture input, at a speed based at least in part on the determined speed of the motion of the gesture input;
outputting, by the computing device and for display on the presence-sensitive output device, a virtual frame reel comprising a plurality of frames from the video content, the frames being located in advance of a current frame of the video content at the time the gesture input is detected, each of the frames being separated by an interval in the video content, the interval selected based on the determined speed of motion of the gesture input, wherein the presence-sensitive output device depicts at least two of the frames concurrently, and depicts the virtual frame reel moving across the presence-sensitive output device in lateral motion;
advancing, by the computing device, a counter position indicating a position of a currently depicted frame of the video content based on the gesture input and in coordination with the rewinding or fast forwarding and the displaying of the plurality of frames from the video content; and
resuming, by the computing device, the video content from a portion that corresponds to the advanced counter position.

21. The method of claim 20, wherein the lateral motion of the concurrently displayed frames has a speed of motion that is constant independent of a speed of motion of the gesture input.

22. The method of claim 20, wherein the concurrently displayed frames are separated by a larger frame interval for a faster speed of motion of the gesture input relative to a slower speed of motion of the gesture input.

23. A computing device, comprising:
at least one processor; and
machine-readable code stored on the computing device comprising executable instructions that are executable by the at least one processor, and which comprise:
executable instructions to output, for display, a video content;
executable instructions to receive, during display of the video output, an indication of a gesture input that has motion with respect to a presence-sensitive input device operatively coupled to the computing device;
executable instructions to determine a speed of motion of the gesture input;
executable instructions to rewind or fast forward the video content in a direction corresponding to the motion of the gesture input, the rewinding or fast forwarding being at a speed based at least in part on the determined speed of the motion of the gesture input; and
executable instructions to output for display, during the rewinding or fast forwarding the video content, a virtual frame carousel, the virtual frame carousel comprising a plurality of frames of the video content displayed in lateral motion in a direction corresponding to the rewinding or fast forwarding.

24. The computing device of claim 23, further comprising a wireless network interface, wherein the computing device is configured for sending a request through the wireless network interface, and downloading data for the video content through the wireless network interface in response to the request.

25. A non-transitory computer-readable storage medium comprising executable instructions for causing at least one processor of a computing device to perform operations comprising:
   outputting, for display, a video content;
   receiving, during display of the video output, an indication of a gesture input that has motion with respect to a presence-sensitive input device operatively coupled to the computing device;
   determining a speed of motion of the gesture input;
   rewinding or fast forwarding the video content in a direction corresponding to the motion of the gesture input, the rewinding or fast forwarding being at a speed based at least in part on the determined speed of the motion of the gesture input; and
   outputting for display, during the rewinding or fast forwarding the video content, a virtual frame carousel, the virtual frame carousel comprising a plurality of frames of the video content displayed in lateral motion in a direction corresponding to the rewinding or fast forwarding.

26. The non-transitory computer-readable storage medium of claim 25, further comprising executable instructions for causing the at least one processor of the computing device to perform operations comprising:
   sending a request through a wireless network interface;
   downloading data for the video content through the wireless network interface in response to the request;
   providing the video content to the presence-sensitive screen while the data for the video content is being downloaded;
   providing a prediction of one or more frames of the video content that are imminently pending to render the frame carousel during the rewinding or fast forwarding of the video content; and
   modifying a frame buffering process based at least in part on the prediction of the one or more frames that are imminently pending to render the frame carousel.

27. The non-transitory computer-readable storage medium of claim 26, further comprising executable instructions for causing the at least one processor of the computing device to perform operations comprising:
   sending an updated request for a change in an order in which frames of the video content are to be sent, based on the prediction of the one or more frames that are imminently pending to render the frame carousel.

28. The method of claim 2, further wherein the interval based on the determined speed of motion of the gesture input is an initial interval, the method further comprising:
   selecting additional frames from the video content that are spaced apart from each other at subsequent intervals that decrease from the initial interval; and
   outputting for display, during rewinding or fast forwarding the video content, the image of the virtual frame reel in lateral motion at a constant speed while outputting the selected frames for display in the virtual frame reel at the subsequent intervals that decrease from the initial interval.

29. The method of claim 1, wherein the presence-sensitive input device comprises a presence-sensitive screen.

* * * * *